United States Patent [19]

West

[11] 4,304,105
[45] Dec. 8, 1981

[54] FLUME COOLER

[75] Inventor: Clinton L. West, Yuba City, Calif.

[73] Assignee: Yuba City Steel Products Co., Yuba City, Calif.

[21] Appl. No.: 211,779

[22] Filed: Dec. 1, 1980

[51] Int. Cl.³ .............................................. F25D 17/02
[52] U.S. Cl. ....................................... 62/375; 104/70;
272/56.5 R; 406/198
[58] Field of Search ...................... 62/63, 64, 374, 375,
62/380; 46/41, 42; 272/56.5 R; 104/70;
406/198

[56] References Cited

U.S. PATENT DOCUMENTS

| | | | |
|---|---|---|---|
| 1,641,441 | 9/1927 | Kolbe | 62/63 |
| 1,769,088 | 7/1930 | Vacassovich | 62/63 |
| 2,923,138 | 2/1960 | Rollins | 62/380 |
| 4,145,042 | 3/1979 | Becker et al. | 272/56.5 R |
| 4,149,710 | 4/1979 | Rouchard | 272/56.5 R |

Primary Examiner—Ronald C. Capossela
Attorney, Agent, or Firm—Lothrop & West

[57] ABSTRACT

A stacked array of inclined flumes interconnected in consecutive zig-zag fashion for cooling canned comestibles upon discharge from a canning cooker. The hot cans are introduced seriatim in a prone or rolling aspect into the upper end of the uppermost flume. Gravity and cooling water combine to transport the parallel, submerged cans down the flumes in transverse register. The rolling action continuously exposes successive portions of the cans to the heat-absorptive water and similarly mixes the cans' contents to effect even cooling. Means is provided for selective removal of heated water from the flumes and reintroduction of cooled water into the flumes at predetermined points to ensure generally uniform water temperature throughout the flumes.

7 Claims, 9 Drawing Figures

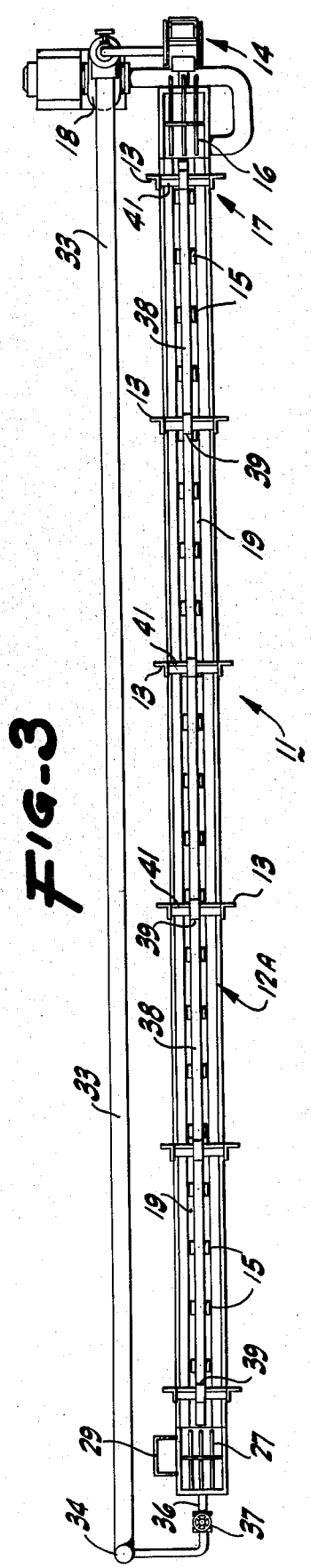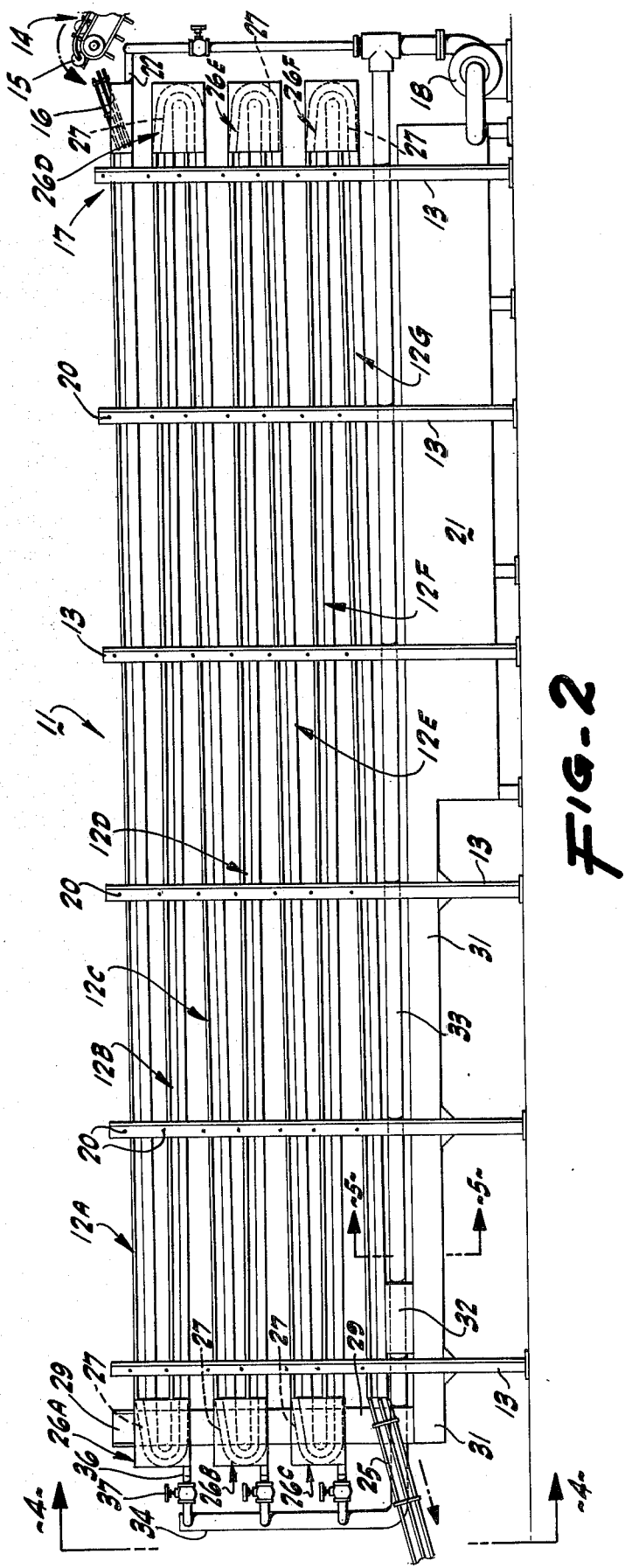
FIG-3
FIG-2

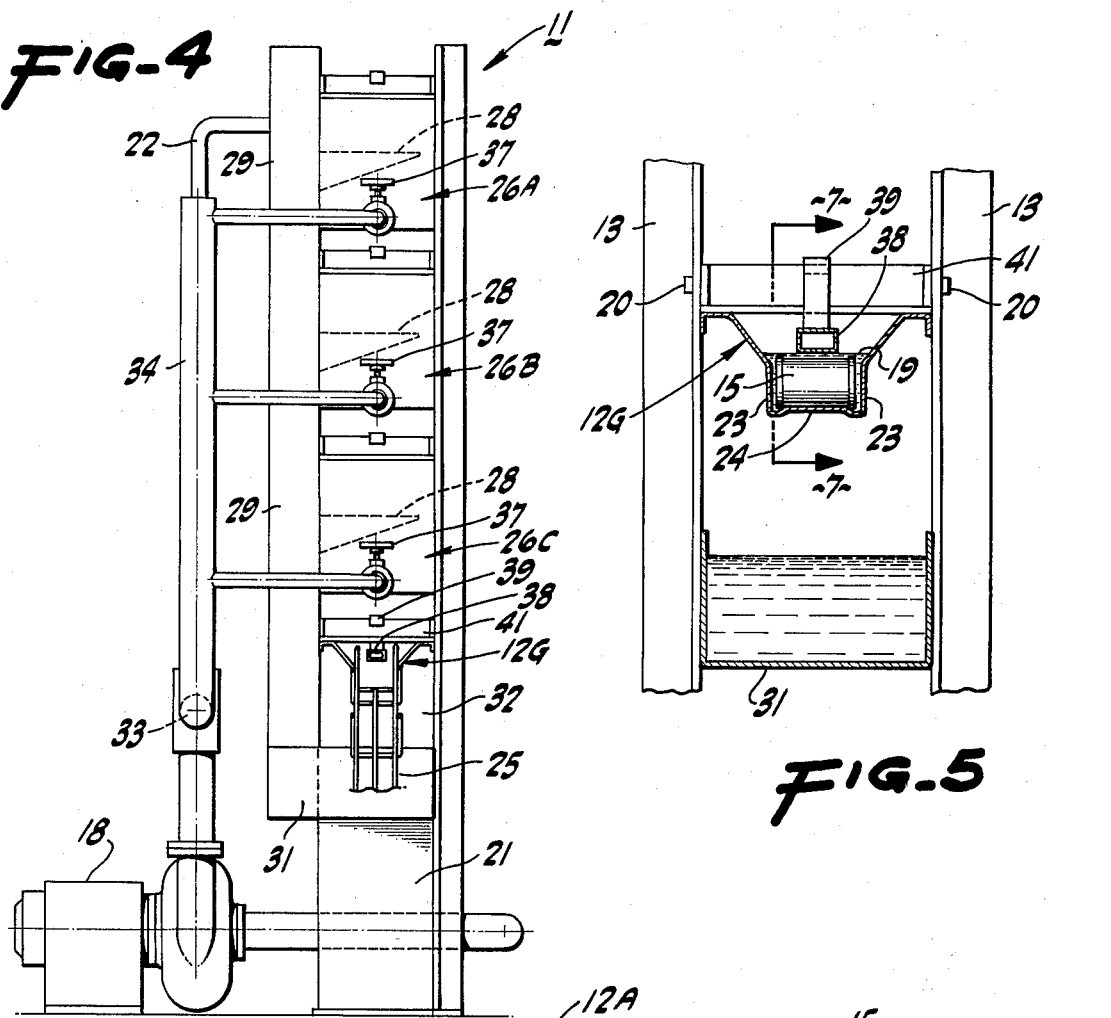

FLUME COOLER

BACKGROUND OF THE INVENTION

1. Field of the Invention

The invention generally relates to apparatus for rapid cooling of canned comestibles following discharge from a canning cooker.

More specifically, the invention relates to an improved and greatly simplified can cooler using a plurality of inclined, interlinked flumes vertically stacked in zig-zag fashion. The invention further relates to control means for selectively manipulating the temperature of the cooling fluid within the flumes, maintaining the fluid's cooling effectiveness. Lastly, restraining means for inhibiting can floating and bobbing during transport down the flume and for preventing can "buildup" in the event of a flume jam, is taught herein.

2. Description of the Prior Art

A variety of mechanically intricate can coolers, designed to cool the continuous stream of hot cans discharging from a cooker, has been developed over the years. These can coolers have relied upon the concurrent application of agitation and heat absorbing fluids to the cans as they are continuously transported through the cooler. The conventional mechanical means which have been used for agitation and transport of the stream of cans includes an array of "walking beams," an endless wire belt, an interlinked chain and cross bar assembly, and a rotary drum having internal helical flights. The means for applying the cooling fluid in these designs is generally provided by an overhead array of water spray nozzles, acting alone, or in combination with compressed air.

The complex drive mechanisms of these prior art can coolers display several inherent deficiencies: they are costly to manufacture and maintain, dangerous to workers, and sometimes impose excessive forces upon the volatile cans emerging from the cooker. Furthermore, the water spray cooling method exhibits a relatively low efficiency factor for withdrawal of heat with respect to elapsed time.

By way of contrast, U.S. Pat. No. 2,597,223, issued to Burgess, and U.S. Pat. No. 2,677,248, granted to Rexford et al., are illustrative can coolers using fairly simple drive mechanisms which upwardly transport the cans to induce content agitating rotation about their axes. However, since conventional water spray cooling methods are used in both designs, the required extent of can cooling can only be achieved by a lengthy residence time within the can cooler, and a commensurate extension of the cooler's transport track.

The present invention provides thorough agitation and brisk transport of the hot cans without the use of any direct mechanical drive mechanism, while improving greatly upon the efficiency of the customary spray cooling methods. Using a compact array of interconnected, inclined flumes of special design, gravity promoted hydraulic flow provides both a simple driving means and a fast, effective cooling means.

In U.S. Pat. No. 3,696,735, issued to Boertje et al., an apparatus for frying food using a plurality of inclined channels carrying cooking oil is disclosed. Both the channels and the transfer means employed therein are specifically designed for non-turbulent transfer of both the cooking oil and the buoyant food pieces throughout the cooking period. The Boertje et al. patent is distinguishable from the applicant's can cooler in that the present invention is designed to immerse completely and agitate continuously the cans as they travel down the array of flumes for cooling.

SUMMARY OF THE INVENTION

A plurality of inclined, interlinked flumes, or channels, is stacked in vertical relation and arranged in opposing, downward directions for continuous receipt and downward transport of hot cans issuing from a cooker. Cool water is continually fed into the upper end of the uppermost flume at a rate sufficient to maintain a substantial flume flow. The cans are loaded, seriatim, into the upper end of the uppermost flume, rolling on their sides and with their axes transverse to the elongated flume. The spacing between the flume walls is such that the cans can freely roll while maintaining proper axial orientation within the defined channel. The completely submerged cans are transported sequentially in rolling fashion down the flumes by gravity induced rolling and hydraulic flow.

The continuous rolling action not only exposes all portions of the cans' surfaces to new quantities of the cooling water, but also agitates the cans' contents. The constant agitation urges the hot inner comestibles outwardly towards the relatively cooler can surfaces, promoting uniform content cooling. Owing to the high heat absorption factor which submersion in a fluid affords, the cans are rapidly and evenly cooled throughout.

The water approaching the lower end of particular flumes absorbs a sufficient amount of heat from the cans to affect adversely its cooling abilities. To offset this problem, heated water is withdrawn at the lower end of selected flumes and a commensurate amount of cool water is reintroduced at the upper end of the subjacent, interconnected flume. In this manner, a high level of cooling performance is achieved for each flume.

Occasionally, a can either defective in construction or lacking in contents will pass from the cooker. Such a can may be so buoyant that it becomes intermittently suspended in the water with the flume. A can, even partially suspended, can vertically or horizontally misalign and jam either the flume or the mouth of a transfer section between adjacent flumes. To reduce such occurrences, can restraining or hold down strips, overlying the flumes, are provided. And if a flume jam should occur, the hold down strips facilitate removal of the defective can and resumption of normal flume operation.

It is an object of the invention, therefore, to provide a generally improved and simplified apparatus for cooling cans, or other containers.

It is another object to provide a container cooling apparatus using a compact array of interlinked, inclined flumes for agitation, transport, and cooling of the cans or containers.

It is a further object to provide means for selective withdrawal of heated water and reintroduction of cooled water throughout the flume array of the present design.

It is yet a further object to provide a means for restraining vertical movement of cans which reduces the occurrences of flume jams and mitigates the effects of a flume jam, should it occur.

These and other objects will be illustrated in the drawings and explained in the detailed description of the preferred embodiment to follow.

BRIEF DESCRIPTION OF DRAWINGS

FIG. 2 is a front elevational view;

FIG. 3 is top plan view;

FIG. 4 is an end elevational view taken on the line 4—4 in FIG. 2;

FIG. 5 is a fragmentary, transverse cross-sectional view to a slightly enlarged scale taken on the line 5—5 in FIG. 2, showing the flume, the hold down strip, and the reservoir plenum;

FIG. 6 is a framentary rear elevational view, to an expanded scale, of a flume transfer coupler, showing the internal guide rods and cans in broken line; FIG. 7 is a fragmentary, longitudinal, cross-sectional view, taken on the line 7—7 in FIG. 5, the view being to an enlarged scale;

DETAILED DESCRIPTION OF THE PREFERRED EMBODIMENT

Figure 1:
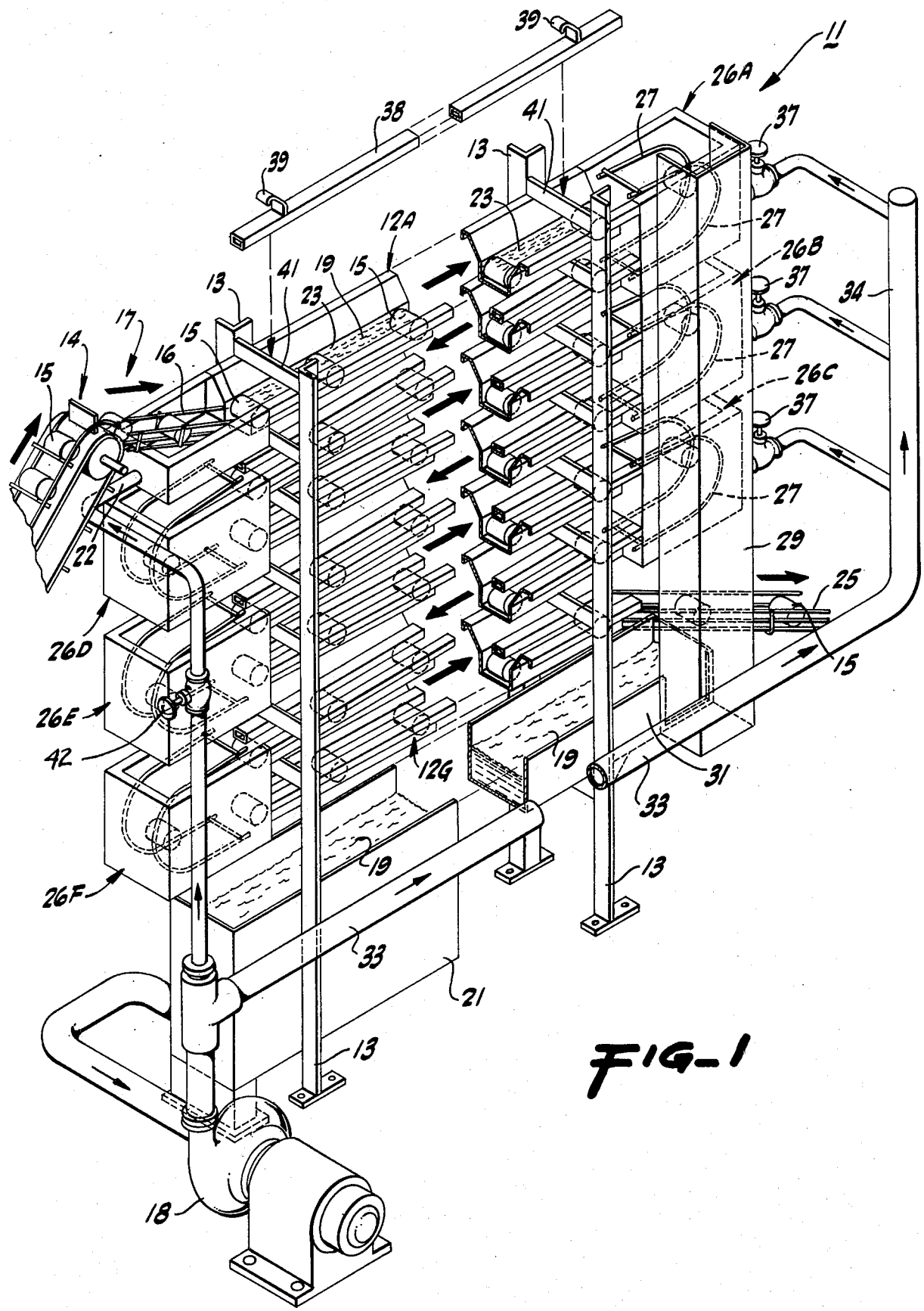
FIG. 1 is a fragmentary, rear perspective view, showing the invention fully operational, with its normal complement of cans passing through the array of flumes.

Making particular reference to FIGS. 1, 2, and 3, the invention 11 comprises an array of vertically stacked, elongated flumes 12A-G, inclusively, supported in alternating inclined relation by an upstanding framework 13. The invention 11 is preferably positioned near the output line of a canning cooker (not shown), allowing convenient interconnection with the invention's loading conveyer 14. The cans 15, emerging from the cooker at an average surface temperature of 175°-195° F., are thereby carried up the loading conveyer 14 to the mouth of the can inlet rod guide 16. The cans 15 descend sequentially through the inlet rod guide 16, and are deposited, with the cans' axes horizontal, in rolling, transverse aspect into the entry portion 17, located at the uppermost end of the uppermost flume 12A (see FIG. 3).

A pump 18 draws water 19 from the reservoir 21, delivering a constant flow through an upper nozzle 22 into the entry portion 17 within the uppermost flume 12A (see FIGS. 1, 2, and 3). The cans 15 are thereby immediately immersed into a flowing stream of the water 19, maintained at a relatively cool flume entry temperature of 90°-95° F.

As can be seen most clearly in FIG. 2, each of the interlinked flumes 12A-12G, inclusively, is inclined downwardly, in alternating opposing directions. The angle of downward inclination of the flumes is extremely important, since it directly affects the flumes' ability to accept continuous delivery of cans at a certain rate without flume overloading or jamming. The framework 13 includes a plurality of bolts 20 for supporting the array of flumes, and each bolt 20 is adjustably positionable for precisely determining the proper downward inclination and aspect of each of the flumes.

Given a fixed total length for the arry of flumes, a particular inclination of the flumes will also substantially determine the total time of a can's immersion and the intensity of a can's rolling agitation, the two factors which most directly affect the extent of can cooling. In other words, a specific flume inclination not only has a direct bearing upon the can acceptance rate, but also has a pronounced effect upon the cooling capabilities of the flume array.

It has been determined that a downward inclination of each of the flumes 12A through 12G of approximately one inch in twenty feet, provides a very satisfactory compromise between the overall performance and the physical size of the flume array. The selected inclination, therefore, satisfies the two primary performance concerns of can acceptance rate and extent of can cooling, while assuring that the collective length of the flumes does not reach unacceptable proportions.

A final variable affecting the performance of the flume arrangement is the rate of flow of the water 19 within the flumes 12A through 12G. In short, a higher rate of water flow increases, commensurately, the rate of can transport, thereby effecting a shorter period of can immersion, or residence time, within the flumes.

A brief presentation of two extremes in can delivery rate to the flume array will illustrate how selective manipulation of the rate of water flow within the flumes can be used to advantage.

In the first instance, assuming a relatively slow can delivery rate of 70 cans per minute, a correspondingly low rate of water flow is desirable. Owing to mass considerations and reactive hydraulic transport effects, the fewer the cans, the faster the rate of can transport down the flumes. However, by using a slower rate of water flow, the rate of can transport is also reduced, therey ensuring adequate residence time within the flume to effect the desired extent of cooling.

It should also be noted that in reducing the rate of water flow, the depth of the water 19 within the flumes is, of course, lowered, Nevertheless, the invention has performed satisfactorily with the cans merely half-submerged within the flumes.

In the second instance, the can delivery rate is increased to a relatively fast 200 can per minute. By increasing the rate of water flow within the flumes, the rate of can transport is augmented to ensure that adjacent cans will not collide upon initial entry of the trailing cans into the top flume.

The greater displacement factor of the cans joins with the increased flow substantially to submerge the cans. Owing to the nearly continuous contact between the water and the cans, a higher coefficient of heat transfer is achieved than if the cans are merely half submerged. The increase in water flow is further necessary to accommodate the heightened requirements for heat absorption. In all operational aspects, then, by speeding up the rate of water flow within the flumes, the flume array is easily adapted to the increased can delivery rate.

In terms of maximum can acceptance rate, an array of seven flumes, each 60 feet in length, as disclosed herein, will adequately handle 200 No. 2½ cans per minute, without allowing any contact between neighboring cans.

However, if this can delivery rate is exceeded, adjacent cans within the flumes tend to come into contact, causing a slowdown in the rate of can transport, and eventually precipitate a flume jam. While the can acceptance rate of 200 cans per minute is adequate to handle the output of most cookers, a higher output could be readily accommodated through the use of a conventional, alternating can diverter and a duplicate flume cooler.

Alternatively, the flume inclination, or down slope, can be increased to augment the rate of can and water transport. However, by increasing the rate of can and water transport, the total flume length must be increased proportionately to ensure an adequate period of can immersion.

During the approximately 3½ to 4 minute trip down the array of seven flumes, the average surface temperature of each can will drop from the average entry temperature of about 175°–195° F., to an exit temperature of about 100°–105° F.

Providing the cans are within this range of exit temperature, they can be conveyed to a label machine for immediate labeling.

If the can exit temperature is substantially above 105° F., the viscous resin pickup material used in the label machines would be ineffectual in drawing up the underlying label.

If, however, the can exit temperature is substantially less than 100° F., the water on the exiting cans would not evaporate in sufficient time, and the labels would become water spotted.

It is apparent, therefore, that one skilled in the art is capable of achieving the desired can acceptance rate and the required can temperature reduction, by carefully adjusting the inclination and length of the flume, or flumes, which comprise the total flume array, along with the rate of water flow within that flume array.

Having presented the overall design considerations, attention now will be directed towards the transport and agitation action which each can undergoes in its flume travel. With reference to FIG. 5, the can 15 is shown transversely positioned between the vertical flume walls 23, and resting upon the raised floor extrusion 24 in the flume 12G. This transverse, prone position is maintained by the loose registration of the can 15 between the walls 23. The distance between the walls must be sufficiently wide to ensure that a slightly deformed can will not readily jam within the rectangular in cross section channel portion of the flume. At the same time, the registration must be adequately precise so that longitudinal, or endwise misalignment of the containers 15 within the rectangular channel portion cannot occur. Considering the No. 2½ can, which is approximately 4⅝" in longitudinal aspect, a channel width, or distance between the walls 23, in the range of 5" to 5½" has proved very satisfactory.

As discussed, with a high rate of can delivery to the flume array, the depth of the water 19 within the flumes is generally maintained so that the containers 15 are completely submerged. Since the total surface area of each can 15 is in contact with the water 19 nearly every moment of flume travel, maximum transfer of heat from the cans to the water is thereby effected.

The combined forces of gravity, acting both upon the water 19 and the can 15, jointly urge the stream of water and the rolling mass of cans down the flumes. As is shown most clearly in FIG. 5, the longitudinal, raised planar floor extrusion 24, extending the full length of each flume, entirely supports the cans 15. In other words, the rimmed, end extremities of the cans 15 do not touch the floor portion of the flume at any time, avoiding the abrasion and possible rusting of the cans' top and bottom rims which would otherwise occur.

Efficient and rapid cooling of the entire contents 40, or comestibles, within the containers requires constant agitation to bring the generally hotter, centrally positioned comestibles and surrounding fluids outwardly and into proximity with the relatively cool walls. The constant, rolling transport of the submerged cans, as practiced by the disclosed preferred embodiment, is capable of achieving a differential of only 8° to 10° F. between the temperature of the comestibles 40 at the can core and the temperature of the can at its outer surface, after each can emerges from the last, lowermost flume 12G into the can exit rod guide 25. This temperature differential is entirely acceptable within the canning industry, and properly prepares the cans for immediate delivery to a labeling machine.

While the invention 11 could be practiced by using a single, extended flume of appropriate dimensions and inclination, a plurality of flumes, stacked in vertical relation provides a physically compact and structurally efficient unit. As explained, each of the flumes 12A–12G, inclusively, is inclined downwardly, in alternating opposing fashion to extract maximum utility from the compact structure shown in FIGS. 1, 2, and 3. In order to ensure a smooth transfer of both the cans and the cooling water between adjacent flumes, a plurality of transfer couplers, 26A–26F, inclusively, is provided.

Each transfer coupler includes a U-shaped, reversal rod guide 27 which interlinks each flume with its respective, subjacent flume. For example, FIG. 6 illustrates the cans 15 being transferred from the lower end of the uppermost flume 12A to the upper end of the immediately subjacent flume 12B. In the manner depicted, not only is a smooth transfer of cans between flumes accomplished, but also, a reversal of can rotation is effected. Since the axes of the cans 15 remain parallel through the transfer, the reversal of direction of travel brings about the reversal of rotation, as shown by the arrows indicating direction of rotation (see FIG. 6). During the cans' downward progress through the plurality of flumes, the aspect of can rotation is reversed six times. It is believed that this reversal of can rotation augments the agitation of the can's contents, and hence bolsters the overall cooling efficiency of the invention 11.

The rate of can cooling is further, directly dependent upon the temperature differential between the can surface and the surrounding water. It will be appreciated that as an individual can is transported down a particular flume, the average temperature of the surrounding water will rise in accordance with the continuous transfer of heat from the can to the water. To offset this cumulative rise in water temperature and degradation in cooling performance, the warmed water is selectively withdrawn and cooler water is reintroduced, at strategic locations throughout the flume array.

While water withdrawal and reintroduction could be accomplished through appropriate placement of drains and nozzles within the flumes themselves, the transfer coupler provides an ideal housing for accommodating this process. Water can be withdrawn and reintroduced within the transfer coupler while the cans are supported entirely by the reversal rod guides 27 and transported completely by gravity and kinetic energy. Consequently, the withdrawal and reintroduction of water within the transfer coupler will not disturb the smooth and continuous transport of the cans. If the withdrawal and reintroduction of water occurred within a flume, where transport of the cans is dependent to a considerable extent upon the flow of water, a discontinuity in can rolling action may occur.

Figure 9:
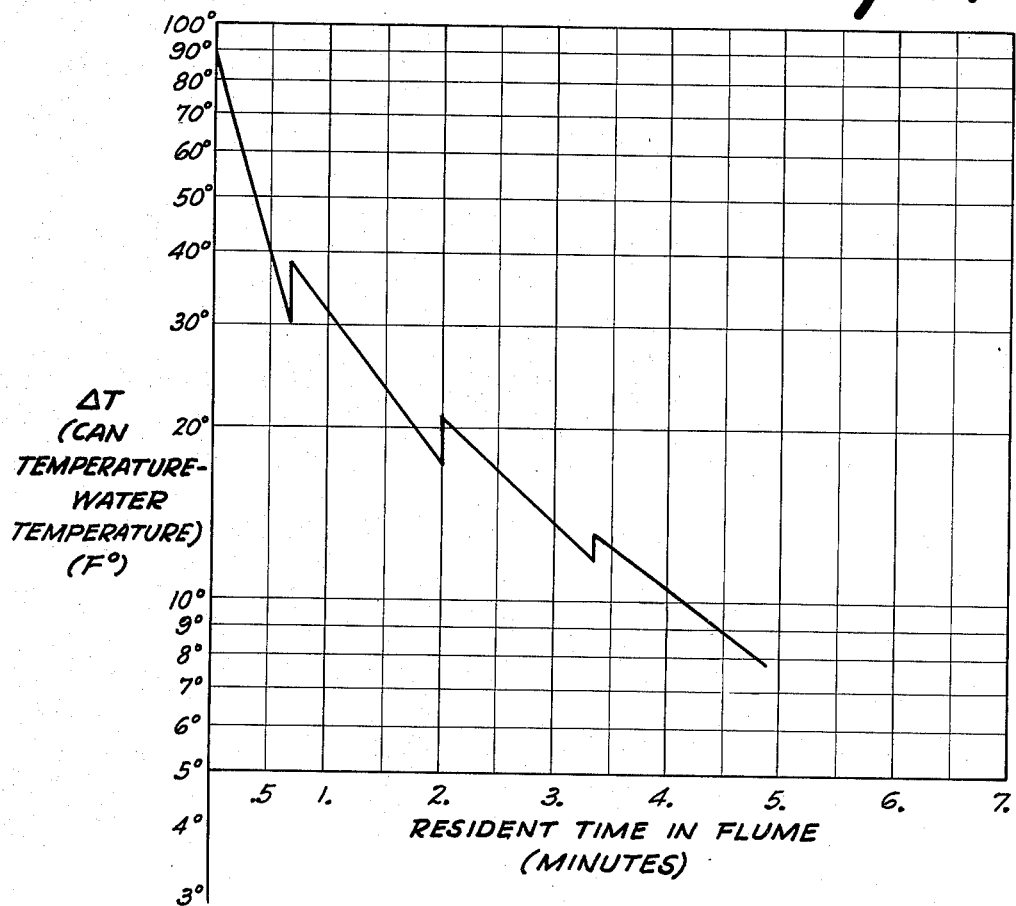

Since the maximum can to water temperature differential exists within the uppermost flume 12A, the water 19 within flume 12A absorbs a considerable amount of heat (see FIG. 9). Therefore, the first withdrawal of heated water and reintroduction of cooled water, takes place within the transfer coupler 26A, located at the lower end of the uppermost flume 12A (see FIGS. 1, 2 and 6). Subsequent withdrawal and reintroduction of water occurs in transfer couplers 26B and 26C. The transfer couplers 26D, 26E, and 26F, merely pass the cans and downflowing water from their respective upper flume to their respective subjacent flume.

Making particular reference to FIGS. 2, 4, and 6, each transfer coupler 26A–C, inclusively, has a wedge-shaped discharge chute 28 which captures the water flowing from the lower end of each respective upper flume. The discharge chute 28 is located immediately beneath the upper portion of the reversal rod guide 27, through which the heated water can readily pass downwardly for collection. Each discharge chute 28 is in communication with the downspout 29, for common transfer to the heated water into the plenum 31. As is shown most clearly in FIG. 2, a flume drain 32, located at the lower end of the lowermost flume 12G, removes the last stream of water from the flume array and deposits it directly into the underlying plenum 31.

The plenum 31, in turn, channels all of the recaptured heated water into the reservoir 21. Water cooling apparatus (not shown) such as an evaporative cooling tower, or a cooling pool, could readily be interconnected between the plenum 31 and the reservoir 21, further to cool the water for subsequent reuse. In other words, external cooling means would likely be required to lower the average temperature of the water fed into, or contained within, the reservoir 21 for most effective practice of the invention.

A primary flume feed pipe 33 diverts a considerable amount of the water discharged from the pump 18, and delivers it to the input manifold 34. The input manifold, in turn, is interconnected to the input nozzles 36 located within the lower portion of each transfer coupler 26A, 26B, and 26C (see FIGS. 4 and 6). The relatively cool water is thereby introduced into the upper end of the respective subjacent flume for each transfer coupler. A plurality of control valves 37 provides selective determination of the amount of cool water continuously reintroduced into the flumes 12B, 12D, and 12F. The initial determination of the rate of water flow, however, is established within the flume 12A by a main control valve 42 (see FIG. 1). Dependent upon the required can acceptance rate and extent of cooling, the main control valve 42 is adjusted in accordance with the parameters already discussed. Then, the control valves 37 are adjusted to conform with the established depth and rate of flow of water within each respective flume.

Figure 8:
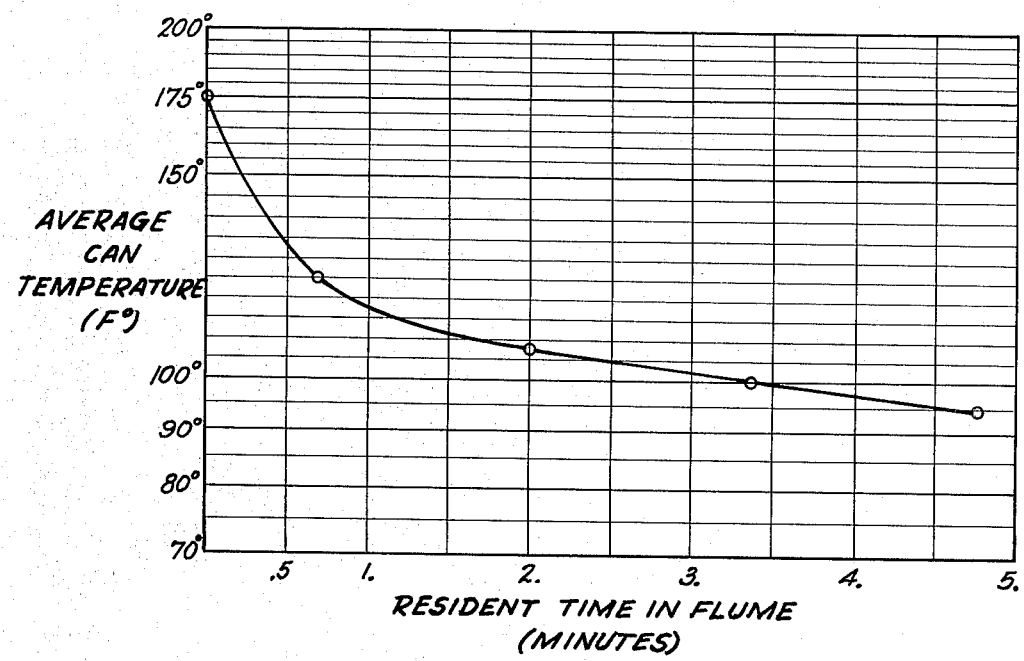
FIG. 8 is a graph depicting the continuous drop in average can temperature as a function of residence time within the invention; and, FIG. 9 is a graph illustrating $\Delta T$, or the difference between can temperature and surrounding water temperature at selective sampling positions throughout the flume array, determined by elapsed time from initial can entry.

The overall performance of the invention is evident in FIG. 8. From a can entry temperature averaging 175°, a can exit temperature of 100° F. is achieved in slightly less than 3½ minutes. By way of comparison, a commercial can cooler using the conventional water spray cooling methods, takes 12 to 14 minutes to attain the same drop in average can temperature.

The graph depicted in FIG. 9 shows the profound effect which the selective withdrawal of heated water and reintroduction of cooled water has on $\Delta T$. The greater the value of $\Delta T$ (the difference between can temperature and surrounding water temperature) the more rapid will be the rate of can cooling (compare FIGS. 8 and 9). The three sharp upswings in the value of $\Delta T$ in FIG. 9 are indicative of the considerable differences in water temperature measured at the can entry and exit points within the transfer couplers 26A, 26B, and 26C.

While the operation of the invention 11 is extremely simple and troublefree, occasionally a defective can will enter the uppermost flume 12A and cause a flume jam. The defective can either may be lacking in contents, and would therefore be abnormally light, or it may be distended and distorted in shape.

An abnormally light can will have a tendency to float randomly within the flume, and eventually become either horizontally or vertically disoriented. That is to say, the can may suddenly shift into either an endwise or an upstanding orientation as it travels down the flume. Either of these disorientations creates a can stoppage and rapid water buildup behind the flume jam. While the invention has shown a remarkable capacity smoothly to reinstate normal water and can transport following corrective removal of the offending can, a flume adapted in the form of a can restrainer 38, or hold down strip has proven most effective in precluding the initial jam.

A can hold down strip 38 overlies each of the flumes, and is vertically spaced above the water level, as shown in FIG. 7. A plurality of support hooks 39 is attached to the upper surface of each strip 38 and rests upon a respective, transversely positioned angle brace 41. In the event that a light can enters the uppermost flume 12A, the hold down strip 38 will inhibit the can from floating to the extent that it would otherwise become either horizontally or vertically disoriented.

In short, the hold down strip 38 precludes the excessive vertical movement of a light can within a flume which could ultimately result in a flume jam situation. The hold down strip also limits the extent of occasional vertical bobbing which a can of normal weight may experience during flume travel. By limiting the bobbing action, the cans will make more contact with the raised extrusion 24, inducing constant can rolling and content agitation. Thus, the cans are both laterally confined by the walls 23 and vertically restricted by the hold down strip 38, to encourage their jam-free, rolling transport and agitation.

If a deformed, defective can should become lodged within a flume, the hold down strip 38 further prevents vertical buildup, or bulging, of the cans being forced against the lodged can. Since the support hooks 39 are merely resting upon the braces 41, the operator need only first lift the hold down strip 38 slightly to remove the defective can, and then lower the hold down strip once again for normal operation to resume. The vertical buildup which could cause the disorientation of a considerable number of cans, is thereby avoided.

It will be appreciated, therefore, that I have described and shown a can cooler which is not only much simpler and less expensive than that known heretofore, but also one which performs the desired extent of can cooling in a much shorter period of time than known prior art devices.

I claim:

1. An apparatus for cooling the contents of sealed cylindrical containers at an elevated temperature comprising:
    a. a frame;
    b. flume means for transporting the containers within a fluid medium, said flume means being attached to said frame and including an upper, loading end and a lower, discharge end, said flume means further including a plurality of elongated channels in vertically stacked relation, said plurality of channels sloping downwardly in alternating directions with the lower end of each of said channels overlying the upper end of a respective, subjacent channel, each of said channels having a planar floor and parallel vertical side walls, the distance between said side walls being slightly greater than the longitudinal dimension of the cylindrical containers;

c. inlet means for introducing fluid medium at said loading end, said fluid medium having a given temperature less than the elevated temperature;

d. outlet means for withdrawing the fluid medium at a selected location on said flume means;

e. loading means for introducing the containers transversely into the channel at said loading end for rolling movement toward said discharge end;

f. coupling means for downwardly transferring the fluid medium and the containers from said lower end of each of said channels to said upper end of a respective subjacent channel; and g. discharge means for withdrawing the containers at a predetermined reduced temperature at said discharge end, heat being transferred from the containers to the fluid medium as the containers and the fluid medium progress from said loading end toward said discharge end.

2. An apparatus as in claim 1 including draining means in communication with at least one predetermined location along at least one of said channels for selectively withdrawing from said channel a predetermined volume of relatively warm fluid medium; and filling means for introducing into said channel a predetermined quantity of relatively cool fluid medium, so that the temperature range of said fluid medium through said plurality of channels is relatively limited in extent.

3. An apparatus as in claim 2 wherein said draining means includes a drain at the lowermost end of each of said channels; and said filling means includes a nozzle at the uppermost end of each of said channels.

4. An apparatus as in claim 3 including restraining means positioned above each of said channels for maintaining the containers in a horizontal attitude as they pass through said channels.

5. An apparatus as in claim 4 wherein said restraining means comprises an elongated centrally located strip generally extending the full length of each of said channels and being vertically spaced above the containers to afford only limited vertical excursions of the containers above the floor of said channels.

6. An apparatus as claim 1 wherein said coupling means connecting the adjacent ends of said channels includes a U-shaped guide in substantially horizontal attitude with the upper leg of the U merging with said floor of said upper channel, the lower leg of the U merging with said floor of said lower channel, and the bend of the U reversing the direction of the path of each can and the direction of rotation of each can emerging from said upper channel and entering said U-shaped guide so that each can emerges from said guide and enters said lower channel in forwardly rolling engagement.

7. An apparatus as in claim 1 further including an elevated, median, extrusion extending along said channel floor, the lateral edges of said extrusion being spaced from the adjacent ones of said side walls to define a pair of grooves accommodating the end rims of each of said cans for abrasion-free movement of said end rims.

* * * * *